(12) United States Patent
Ghosh et al.

(10) Patent No.: US 12,430,517 B2
(45) Date of Patent: Sep. 30, 2025

(54) METHOD AND SYSTEM FOR DOCUMENT STRUCTURE BASED UNSUPERVISED LONG-FORM TECHNICAL QUESTION GENERATION

(71) Applicant: Tata Consultancy Services Limited, Mumbai (IN)

(72) Inventors: Subhasish Ghosh, Kolkata (IN); Arpita Kundu, Kolkata (IN); Indrajit Bhattacharya, Kolkata (IN); Pratik Saini, Noida (IN); Tapas Nayak, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 233 days.

(21) Appl. No.: 18/450,588

(22) Filed: Aug. 16, 2023

(65) Prior Publication Data
US 2024/0095466 A1 Mar. 21, 2024

(30) Foreign Application Priority Data
Sep. 12, 2022 (IN) .............................. 202221052005

(51) Int. Cl.
*G06F 40/14* (2020.01)
*G06F 40/137* (2020.01)
(Continued)

(52) U.S. Cl.
CPC ............ *G06F 40/40* (2020.01); *G06F 40/137* (2020.01); *G06F 40/205* (2020.01); *G06Q 50/20* (2013.01);
(Continued)

(58) Field of Classification Search
CPC ...... G06F 40/40; G06F 40/137; G06F 40/205; G06F 18/24323; G06F 40/186;
(Continued)

(56) References Cited

U.S. PATENT DOCUMENTS 11,176,463 B2 * 11/2021 Allen ................... G06F 16/9535
2014/0163962 A1 * 6/2014 Castelli ................. G06F 40/216
704/9

(Continued)

FOREIGN PATENT DOCUMENTS

| CN | 111079387 B | 4/2021 |
| CN | 114281966 A | 4/2022 |
| JP | 7082333 B2 | 6/2022 |

OTHER PUBLICATIONS

Lucas Dresscher et al., "Generation of Assessment Questions from Textbooks Enriched with Knowledge Models," 2021, https://ceur-ws.org/Vol-2895/paper10.pdf.
(Continued)

*Primary Examiner* — Abul K Azad
(74) *Attorney, Agent, or Firm* — Finnegan, Henderson, Farabow, Garrett & Dunner, LLP

(57) ABSTRACT

The present disclosure a method for document structure based unsupervised long-form technical question generation. Initially, the system receives a textbook document. Further, a PDF metadata is extracted from the textbook document using a Natural Language Processing (NLP) technique. Further, a plurality of structures from the textbook document based on the PDF metadata using an NLP based filtering technique. Further, a plurality of index based question templates and Table of Contents (TOC) based question templates are obtained from a plurality of predefined question templates using the plurality of structures. Further, the generated plurality of long-form technical questions are generated using the obtained index and TOC based question templates. The plurality of long-form technical questions are further evaluated by the system using plurality of metrics. Further, the generated plurality of long-form technical questions are used to finetune a supervised question generation model for generating optimal questions from document structure.

18 Claims, 12 Drawing Sheets

(51) Int. Cl.
*G06F 40/205* (2020.01)
*G06F 40/40* (2020.01)
*G06Q 50/20* (2012.01)
*G06V 30/413* (2022.01)

(52) U.S. Cl.
CPC ........ *G06V 30/413* (2022.01); *G06V 2201/10* (2022.01)

(58) Field of Classification Search
CPC ...... G06F 40/30; G06Q 50/20; G06V 30/413; G06V 2201/10
See application file for complete search history.

(56) References Cited

U.S. PATENT DOCUMENTS

| | | | | |
|---|---|---|---|---|
| 2016/0343371 | A1* | 11/2016 | Sharifi | G06F 16/3329 |
| 2017/0032689 | A1* | 2/2017 | Beason | G09B 7/00 |
| 2021/0201174 | A1* | 7/2021 | Huang | G06N 5/041 |
| 2023/0014904 | A1* | 1/2023 | Skiles | G06F 40/103 |

OTHER PUBLICATIONS

Alexander R. Fabbri et al. "Template-Based Question Generation from Retrieved Sentences for Improved Unsupervised Question Answering," Proceedings of the 58th Annual Meeting of the Association for Computational Linguistics, 2020, Publisher: ACL, https://arxiv.org/pdf/2004.11892.pdf.

* cited by examiner decorators, 983–995, 1053
    call and instance management, 984
    class decorators, 990–992
        coding, 1011–1020
    decorator arguments, 994
        versus function annotations, 1043
    function decorators, 986–990
        coding, 996–1011
    functions and classes, managing, 984, 995, 1021
    type testing with, 1045

FIG. 4A

| | |
|---|---:|
| 38. Decorators | 983 |
| What's a Decorator? | 983 |
|     Managing Calls and Instances | 984 |
|     Managing Functions and Classes | 984 |
|     Using and Defining Decorators | 984 |
|     Why Decorators? | 985 |
| The Basics | 986 |
|     Function Decorators | 986 |
|     Class Decorators | 990 |
|     Decorator Nesting | 993 |
|     Decorator Arguments | 994 |
|     Decorators Manage Functions and Classes, Too | 995 |

FIG. 4B

METHOD AND SYSTEM FOR DOCUMENT STRUCTURE BASED UNSUPERVISED LONG-FORM TECHNICAL QUESTION GENERATION

PRIORITY CLAIM

This U.S. patent application claims priority under 35 U.S.C. § 119 to: India Application No. 202221052005, filed on Sep. 12, 2022. The entire contents of the aforementioned application are incorporated herein by reference.

TECHNICAL FIELD

The disclosure herein generally relates to the field of natural language processing and, more particularly, to a method and system for document structure based unsupervised long-form technical question generation.

BACKGROUND

Automated Question Generation (QG) from technical text plays a major role in education assessment Ike conducting online/offline examinations, interviews as well as in intelligent tutoring systems. However, automatic generation of Questions from Natural Language (NL) documents is a challenging task since one word may have different contexts, same idea can be expressed using different words, irony and sarcasm in Machine Learning (ML) models, ambiguity in words, presence of domain specific language and the like.

Conventional methods for automatic Question generation from NL documents are mainly generating Question from structured data associated with the NL documents like databases, ontology data and the like. Very few conventional methods are focusing on Question generation from unstructured NL documents. For example, one method generates question from a given sentence by using logical structure of the sentence and technical terms extracted from that sentence. Another method generates factoid questions like Single-choice questions, Multiple-choice questions, Single-choice fill-in-the-blank questions, Multiple fill-in-the-blank questions, Scale questions, Context questions and fails to generate long-form questions. Another method generates questions based on semantic templates that consider structure of the sentence. Hence there is a challenge in generating questions from unstructured NL documents using document structure.

SUMMARY

Embodiments of the present disclosure present technological improvements as solutions to one or more of the above-mentioned technical problems recognized by the inventors in conventional systems. For example, in one embodiment, a method for Document structure based unsupervised long-form technical question generation is provided. The method includes receiving, by one or more hardware processors, a textbook document, wherein the textbook document is in Portable Document Format (PDF). Further, the method includes extracting, by the one or more hardware processors, a PDF metadata from the textbook document using a Natural Language Processing (NLP) technique, wherein the PDF metadata comprises text sizes, fonts, and text coordinates. Furthermore, the method includes extracting, by the one or more hardware processors, a plurality of structures from the textbook document based on the PDF metadata using a NLP based filtering technique, wherein the plurality of structures includes a plurality of hierarchical index structures and a plurality of Table of Content (TOC) structures, wherein each of the plurality of hierarchical index structures and the plurality of TOC structures is a tree structure includes a plurality of nodes and a plurality of edges connecting the plurality of nodes. Furthermore, the method includes annotating, by the one or more hardware processors, each of the plurality of hierarchical index structures by identifying a plurality of entities and a plurality of contexts corresponding to each of the plurality of entities using a parsing technique, wherein each of the plurality of nodes of each of the plurality of hierarchical index structures is annotated as one of a) an entity, b) a context, and c) an entity with context. Furthermore, the method includes simultaneously annotating, by the one or more hardware processors, each of the plurality of TOC structures by identifying a plurality of type information using the parsing technique, wherein each of the plurality of nodes corresponding to each of the plurality of TOC structures are annotated as one of a) a question, b) a question phrase, c) a VBG (Verb Gerund present participle) phrase, d) a sentence and e) a noun phrase. Furthermore, the method includes obtaining, by the one or more hardware processors, a plurality of index based question templates from a plurality of predefined question templates based on a annotated plurality of hierarchical index structures using an index based question template selection technique. Furthermore, the method includes obtaining, by the one or more hardware processors, a plurality of TOC based question templates from the plurality of predefined question templates based on a annotated plurality of TOC structures using a TOC structure based question template selection technique, wherein the TOC structure based question template selection technique selects the plurality of TOC based question templates based on the plurality of type information. Finally, the method includes generating, by the one or more hardware processors, a plurality of long-form technical questions based on the annotated plurality of hierarchical index structure and the annotated plurality of TOC structures by instantiating the plurality of index based question templates and the plurality of TOC based question templates.

In another aspect, a system for Document structure based unsupervised long-form technical question generation is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a textbook document, wherein the textbook document is in Portable Document Format (PDF). Further, the one or more hardware processors are configured by the programmed instructions to extract, a PDF metadata from the textbook document using a Natural Language Processing (NLP) technique, wherein the PDF metadata comprises text sizes, fonts, and text coordinates. Furthermore, the one or more hardware processors are configured by the programmed instructions to extract, a plurality of structures from the textbook document based on the PDF metadata using a NLP based filtering technique, wherein the plurality of structures includes a plurality of hierarchical index structures and a plurality of Table of Content (TOC) structures, wherein each of the plurality of hierarchical index structures and the plurality of TOC structures is a tree structure includes a plurality of nodes and a plurality of edges connecting the plurality of nodes. Furthermore, the one or more hardware processors are configured by the programmed instructions to annotate each of the plurality of hierarchical index structures by identifying a plurality of entities and a plurality of contexts corresponding to each of the plurality of entities using a parsing technique, wherein each of the plurality of nodes of each of the plurality of hierarchical index structures is annotated as one of a) an entity, b) a context, and c) an entity with context. Furthermore, the one or more hardware processors are configured by the programmed instructions to simultaneously annotate, each of the plurality of TOC structures by identifying a plurality of type information using the parsing technique, wherein each of the plurality of nodes corresponding to each of the plurality of TOC structures are annotated as one of a) a question, b) a question phrase, c) a VBG (Verb Gerund present participle) phrase, d) a sentence and e) a noun phrase. Furthermore, the one or more hardware processors are configured by the programmed instructions to obtain a plurality of index based question templates from a plurality of predefined question templates based on an annotated plurality of hierarchical index structures using an index based question template selection technique. Furthermore, the one or more hardware processors are configured by the programmed instructions to obtain, a plurality of TOC based question templates from the plurality of predefined question templates based on a annotated plurality of TOC structures using a TOC structure based question template selection technique, wherein the TOC structure based question template selection technique selects the plurality of TOC based question templates based on the plurality of type information. Finally, the one or more hardware processors are configured by the programmed instructions to generate, a plurality of long-form technical questions based on the annotated plurality of hierarchical index structure and the annotated plurality of TOC structures by instantiating the plurality of index based question templates and the plurality of TOC based question templates.

In yet another aspect, a computer program product including a non-transitory computer-readable medium having embodied therein a computer program for Document structure based unsupervised long-form technical question generation is provided. The computer readable program, when executed on a computing device, causes the computing device to receive a textbook document, wherein the textbook document is in Portable Document Format (PDF). Further, the computer readable program, when executed on a computing device, causes the computing device to extract, a PDF metadata from the textbook document using a Natural Language Processing (NLP) technique, wherein the PDF metadata comprises text sizes, fonts, and text coordinates. Furthermore, the computer readable program, when executed on a computing device, causes the computing device to extract, a plurality of structures from the textbook document based on the PDF metadata using a NLP based filtering technique, wherein the plurality of structures includes a plurality of hierarchical index structures and a plurality of Table of Content (TOC) structures, wherein each of the plurality of hierarchical index structures and the plurality of TOC structures is a tree structure includes a plurality of nodes and a plurality of edges connecting the plurality of nodes. Furthermore, the computer readable program, when executed on a computing device, causes the computing device to annotate each of the plurality of hierarchical index structures by identifying a plurality of entities and a plurality of contexts corresponding to each of the plurality of entities using a parsing technique, wherein each of the plurality of nodes of each of the plurality of hierarchical index structures is annotated as one of a) an entity, b) a context, and c) an entity with context. Furthermore, the computer readable program, when executed on a computing device, causes the computing device to simultaneously annotate, each of the plurality of TOC structures by identifying a plurality of type information using the parsing technique, wherein each of the plurality of nodes corresponding to each of the plurality of TOC structures are annotated as one of a) a question, b) a question phrase, c) a VBG (Verb Gerund present participle) phrase, d) a sentence and e) a noun phrase. Furthermore, the computer readable program, when executed on a computing device, causes the computing device to obtain a plurality of index based question templates from a plurality of predefined question templates based on an annotated plurality of hierarchical index structures using an index based question template selection technique. Furthermore, the computer readable program, when executed on a computing device, causes the computing device to obtain, a plurality of TOC based question templates from the plurality of predefined question templates based on an annotated plurality of TOC structures using a TOC structure based question template selection technique, wherein the TOC structure based question template selection technique selects the plurality of TOC based question templates based on the plurality of type information. Finally, the computer readable program, when executed on a computing device, causes the computing device to generate, a plurality of long-form technical questions based on the annotated plurality of hierarchical index structure and the annotated plurality of TOC structures by instantiating the plurality of index based question templates and the plurality of TOC based question templates.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 4A and 4B are example index structure and TOC structure for the processor implemented method for document structure based unsupervised long-form technical question generation implemented by the system of FIG. 1 according to some embodiments of the present disclosure.

DETAILED DESCRIPTION

Figure 1:
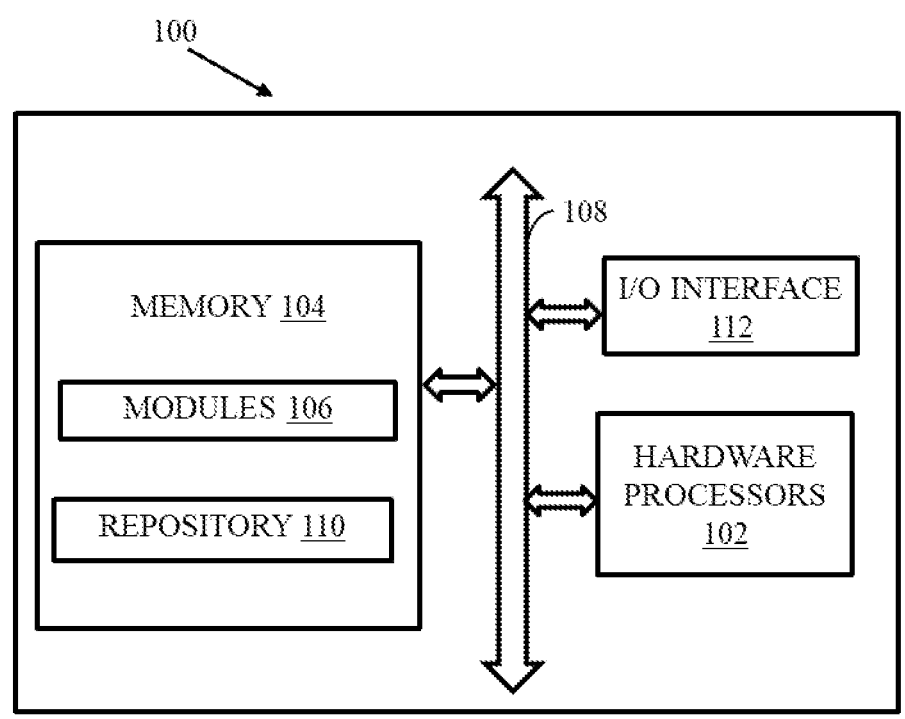
FIG. 1 is a functional block diagram of a system for document structure based unsupervised long-form technical question generation, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Conventional methods for automatic Question generation from NL documents are mainly generating Question from structured data associated with the NL documents like databases, ontology data and the like. Very few conventional methods are focusing on QA generation from unstructured NL documents. Another method generates factoid questions and fails to generate long-form questions. Another method generates questions based on semantic templates that consider structure of the sentence. Hence there is a challenge in generating questions from unstructured NL documents using document structure.

Embodiments herein provide a method and system for document structure based unsupervised long-form technical question generation. The present disclosure provides an efficient method for generating long-form technical questions from textbook documents that are answerable from the book context based on structure information associated with the textbook document using Natural Language Processing (NLP). For example, the structure information includes index and Table of Contents (TOC) of textbooks.

Initially, the system receives a textbook document, wherein the textbook document is in Portable Document Format (PDF). Further, a PDF metadata is extracted from the textbook document using a Natural Language Processing (NLP) technique, wherein the PDF metadata comprises text sizes, fonts, and text coordinates. Further, a plurality of structures from the textbook document based on the PDF metadata using an NLP based filtering technique. The plurality of structures comprises a plurality of hierarchical index structures and a plurality of Table of Content (TOC) structures. Each of the plurality of hierarchical index structures is annotated further by identifying a plurality of entities and a plurality of contexts corresponding to each of the plurality of entities using a parsing technique. Simultaneously, each of the plurality of TOC structures is annotated by identifying a plurality of type information using the parsing technique. Further, a plurality of index based question templates are obtained from a plurality of predefined question templates based on the annotated plurality of hierarchical index structures using an index based question template selection technique. Post obtaining the plurality of index based question templates, a plurality of TOC based question templates are obtained from the plurality of predefined question templates based on the annotated plurality of TOC structures using a TOC structure based question template selection technique, wherein the TOC structure based question template selection technique selects the plurality of TOC based question templates based on the plurality of type information. Finally, a plurality of long-form technical questions are generated based on the annotated plurality of hierarchical index structure and the annotated plurality of TOC structures by instantiating the plurality of index based question templates and the plurality of TOC based question templates. Further, the generated plurality of long-form technical questions are used to finetune a supervised question generation model for generating optimal questions from document structure. In an embodiment, the plurality of long-form technical questions generated by the present disclosure is evaluated by the system using plurality of metrics. The plurality of metrics includes a context-relevance, a context-closedness, a context-completeness, a level-span diversity, number of unique technical question forms.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 is a functional block diagram of an document structure based unsupervised long-form technical question generation, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
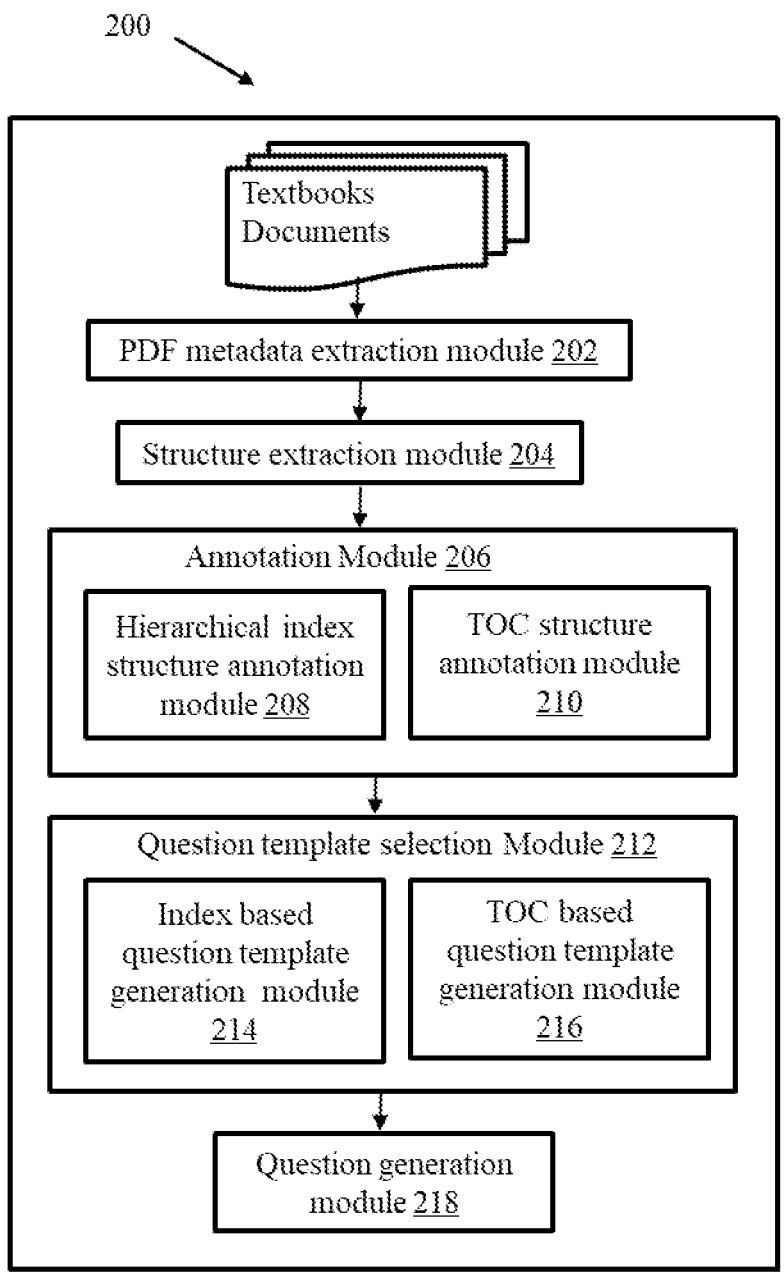
FIG. 2 illustrates a functional architecture of the system of FIG. 1, for document structure based unsupervised long-form technical question generation, in accordance with some embodiments of the present disclosure.
Figure 3A:
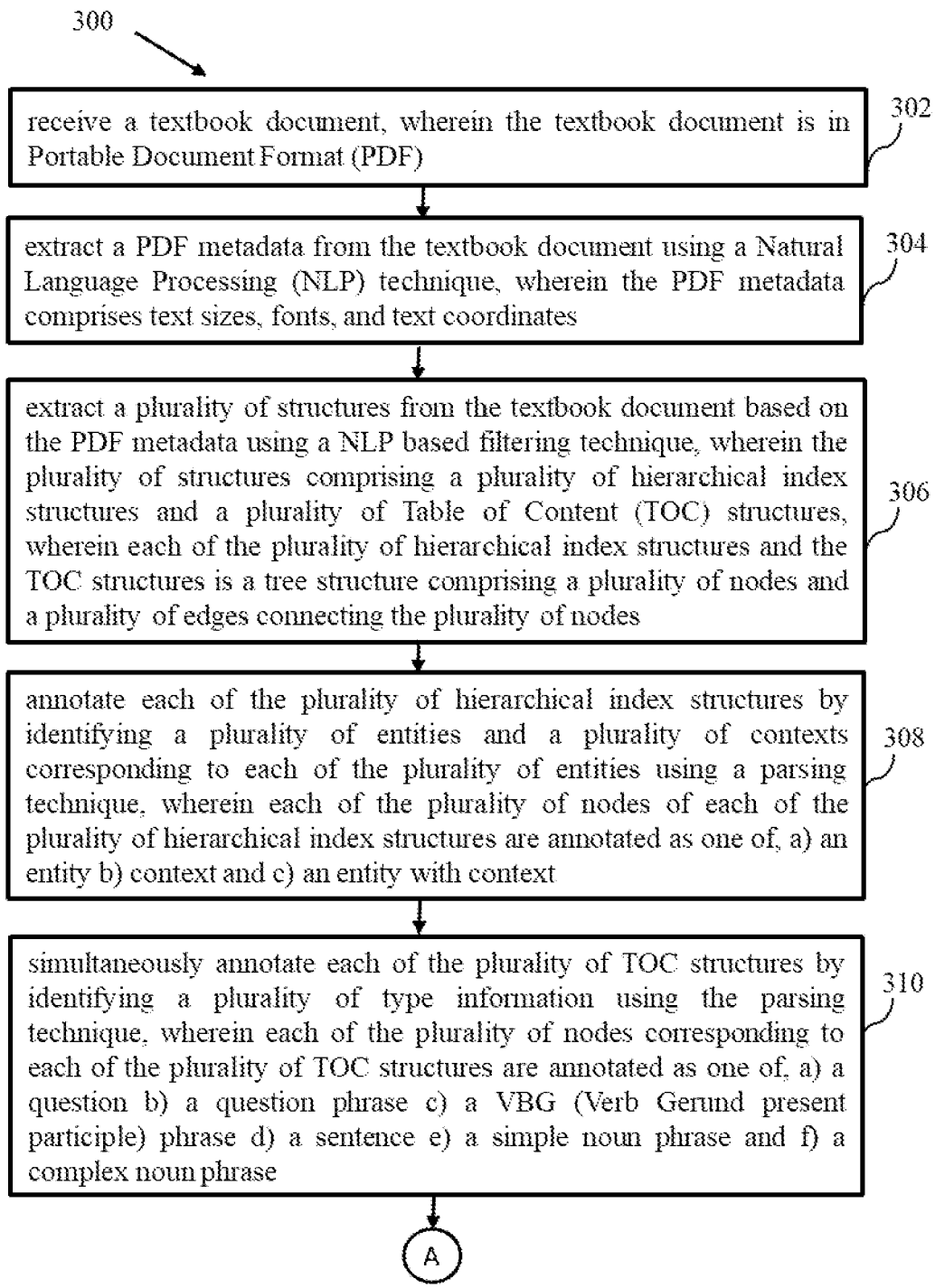
FIGS. 3A and 3B are exemplary flow diagrams illustrating a processor implemented method 300 for document structure based unsupervised long-form technical question generation implemented by the system of FIG. 1 according to some embodiments of the present disclosure.
Figure 3B:
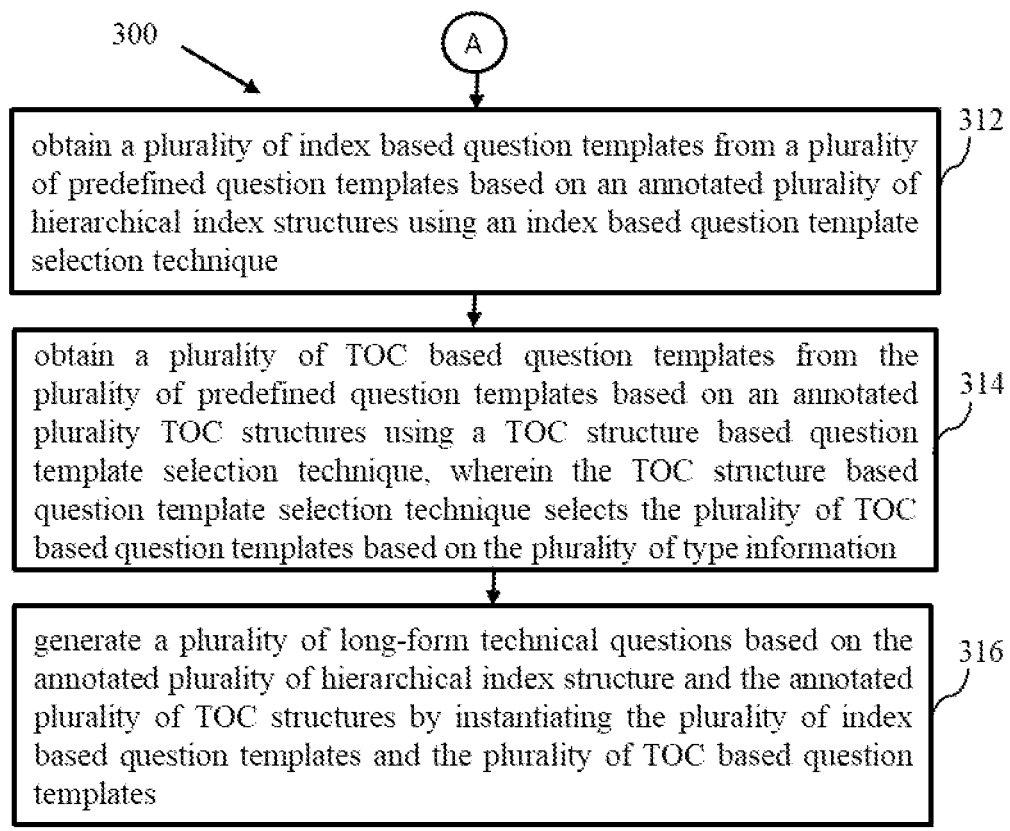

The plurality of modules 106 include programs or coded instructions that supplement applications or functions performed by the system 100 for document structure based unsupervised long-form technical question generation. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the modules 106 includes a PDF metadata extraction module (shown in FIG. 2), a structure extraction module (shown in FIG. 2), an annotation module (shown in FIG. 2), a question template selection module (shown in FIG. 2) and a question generation module (shown in FIG. 2). The annotation module includes a hierarchical index structure annotation module and a Table of Contents (TOC) structure annotation module. The question template selection module includes index based question template selection module and a TOC based question template selection module. In an embodiment, FIG. 2 illustrates a functional architecture of the system of FIG. 1, for document structure based unsupervised long-form technical question generation, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIGS. 3A and 3B, FIGS. 5A and 5B.

FIG. 3 is an exemplary flow diagram illustrating a method 300 for document structure based unsupervised long-form technical question generation implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive the textbook document. The textbook document is in Portable Document Format (PDF).

At step 304 of the method 300, the PDF meta data extraction module 202 executed by the one or more hardware processors 102 is configured by the programmed instructions to extract the PDF metadata from the textbook document using the NLP technique. For example, the PDF metadata includes text sizes, fonts, and text coordinates of the textbook document. In an embodiment, a "pdfminer" library is used to extract the PDF metadata from the textbook document.

At step 306 of the method 300, the structure extraction module 204 executed by the one or more hardware processors 102 is configured by the programmed instructions to extract a plurality of structures from the textbook document based on the PDF metadata using the NLP based filtering technique. For example, the NLP based filtering is performed by writing a wrapper on top of the "pdfminer" library to remove header and footer from the textbook document and, annotates entry, level and page numbers in the hierarchical index structure and the TOC structure. For example, now referring to FIG. 4A, "decorators" is annotated as an entry and the level as 1. Similarly, "983-995" and 1053 are marked as page numbers. Similarly, "call and instance management" is annotated as an entry with level 2.

The plurality of structures includes the plurality of hierarchical index structures and the plurality of TOC structures. Each of the plurality of hierarchical index structures and the TOC structures is a tree structure comprising a plurality of nodes and a plurality of edges connecting the plurality of nodes. Each of the plurality of nodes associated with each of the plurality of the hierarchical index structures represents an entry in an index associated with the textbook document, wherein each of the plurality of nodes associated with each of the plurality of TOC structures represents an entry in TOC associated with the textbook document. Each of the plurality of edge represents relationship between the nodes. In an embodiment, indexes and TOCs of the textbook document is represented as a forest with a plurality of tress.

Figure 4C:
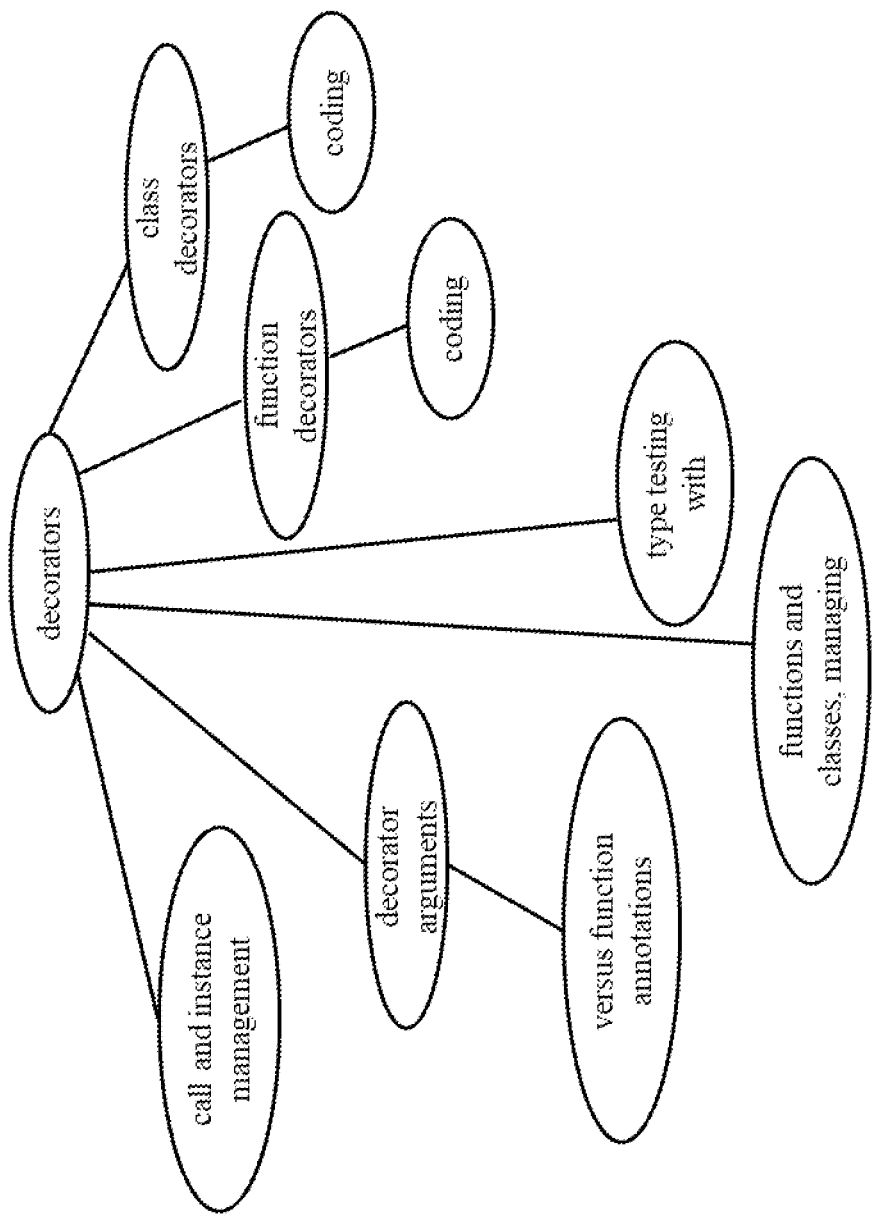
FIGS. 4C and 4D are exemplary hierarchical index structure and Table of Contents (TOC) structure for the processor implemented method for document structure based unsupervised long-form technical question generation implemented by the system of FIG. 1 according to some embodiments of the present disclosure.
Figure 4D:
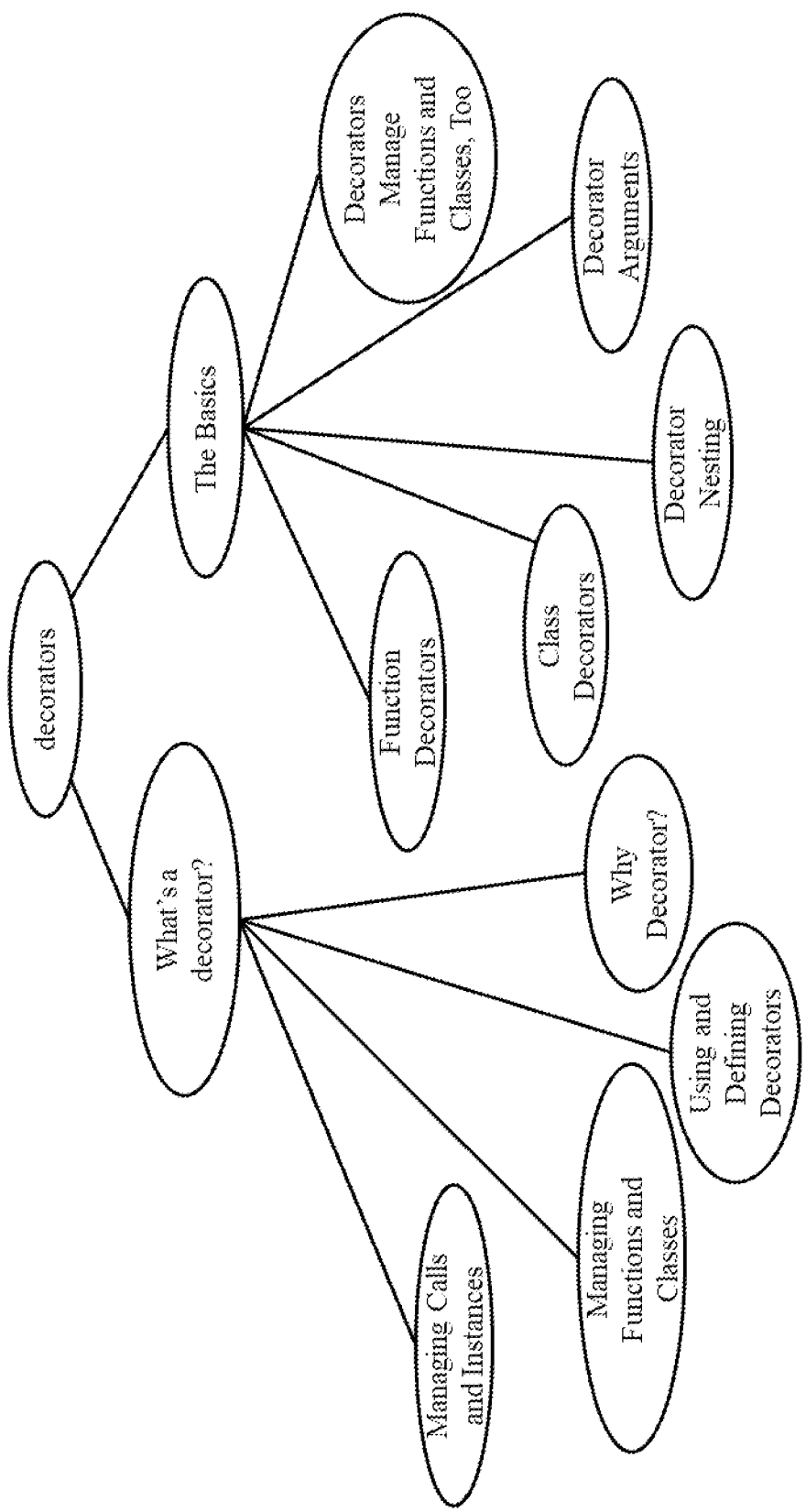

For example, FIG. 4A illustrates an example index (a portion of index) of a textbook and FIG. 4B illustrates an example TOC (a portion of TOC) of a textbook. The hierarchical index structure corresponding to the index shown in FIG. 4A is illustrated in FIG. 4C. Now referring to FIG. 4C, the hierarchical index structure includes 3 levels with parent and child relationship and the number of levels depends on the entries in the index. Similarly, the TOC structure of the TOC shown in FIG. 4B is illustrated in FIG. 4D. Now referring to FIG. 4D, the number of levels depend on the entries in the TOC.

Figure 4E:
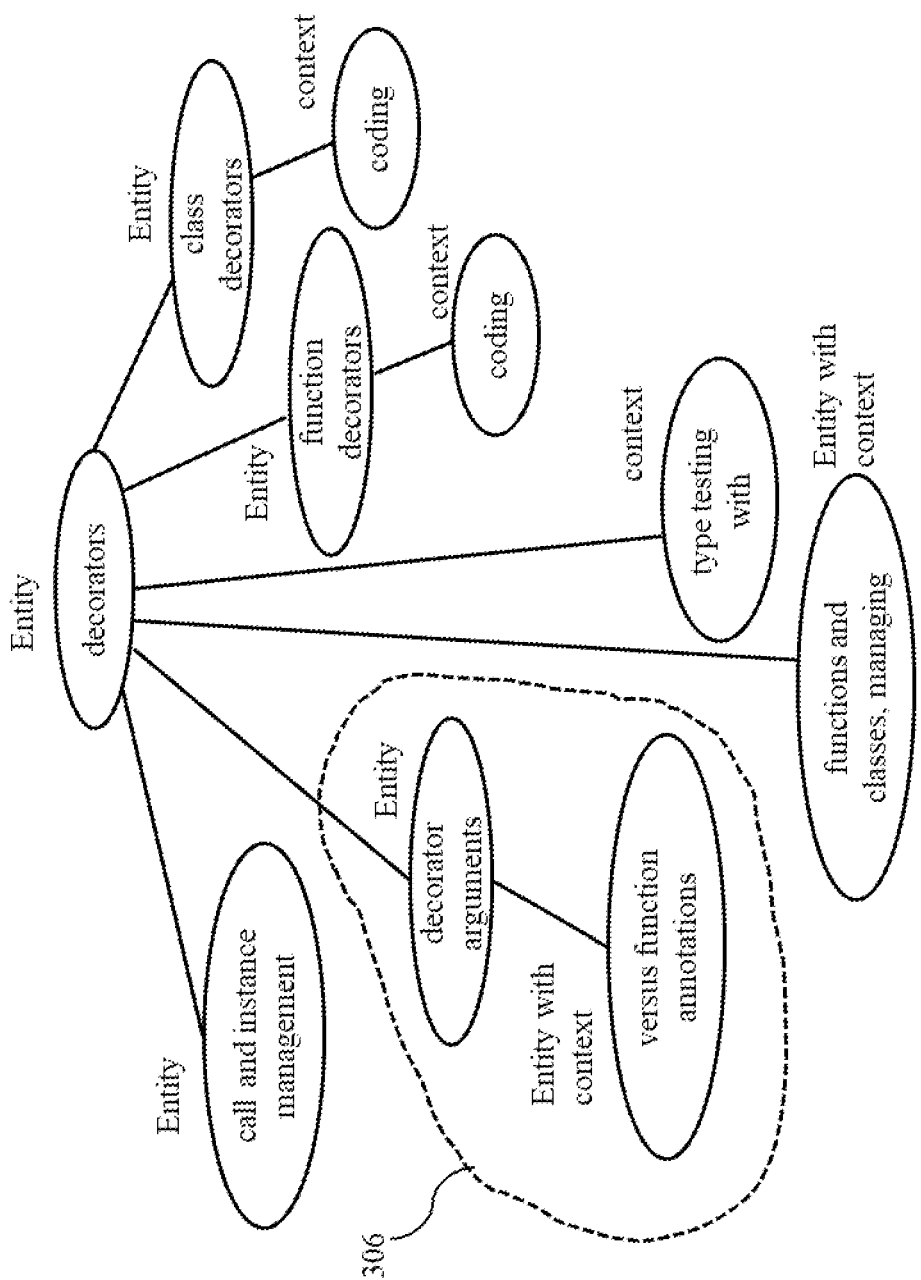
FIGS. 4E, 4F, and 4G are exemplary annotated structures for the processor implemented method for document structure based unsupervised long-form technical question generation implemented by the system of FIG. 1 according to some embodiments of the present disclosure.

At step 308 of the method 300, the hierarchical index structure annotation module 208 executed by the one or more hardware processors 102 is configured by the programmed instructions to annotate each of the plurality of hierarchical index structures by identifying a plurality of entities and a plurality of contexts corresponding to each of the plurality of entities using a parsing technique. For example, the parsing can be performed using POS tags, shallow parsing and simple pattern. Each of the plurality of nodes of each of the plurality of hierarchical index structures are annotated as one of, a) an entity b) a context and c) an entity with context, as shown in FIG. 4E. Now referring to FIG. 4E, "decorators", "call and instance management", "class decorators", "function decorators", "decorator arguments" are entities, "type testing with" is a context and "functions and class, managing" and "versus function annotation" are entities with context.

Figure 4F:
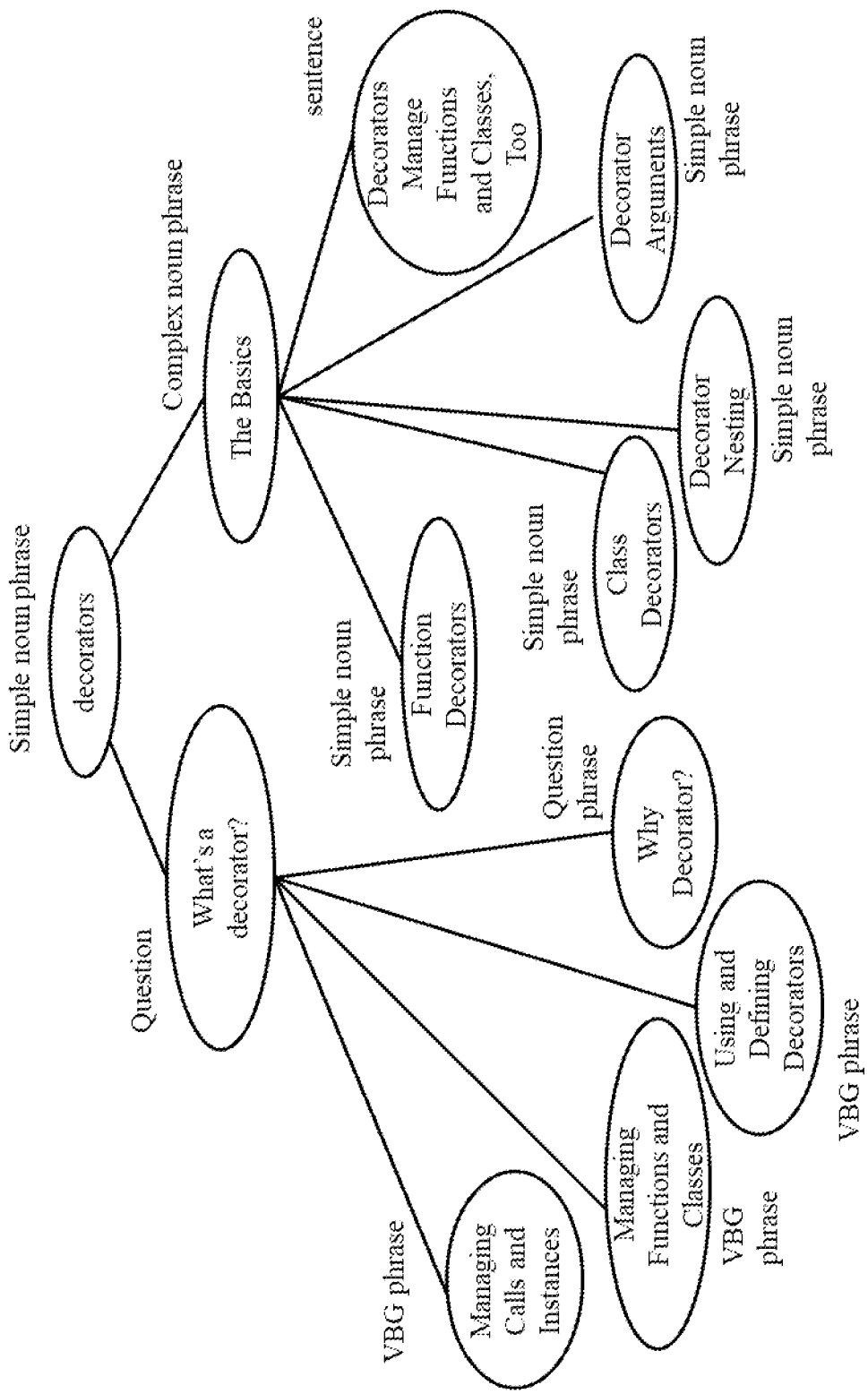

At step 310 of the method 300, the TOC structure annotation module 210 executed by the one or more hardware processors 102 is configured by the programmed instructions to simultaneously annotate each of the plurality of TOC structures by identifying the plurality of type information (question, question phrase, VBG, sentence, noun and the like) using the parsing technique, wherein each of the plurality of nodes corresponding to each of the plurality of TOC structures are annotated based on the type information as one of, a) a question b) a question phrase c) a VBG (Verb Gerund present participle) phrase, for example, the words ending with "ing" d) a sentence and e) a noun phrase as shown in FIG. 4F. The noun phrase may be of varying degrees of complexity and hence it is further subdivided into a simple noun phrase and a complex noun phrase based on the corresponding degree of complexity.

At step 312 of the method 300, the index based question template selection module 214 executed by the one or more hardware processors 102 is configured by the programmed instructions to obtain the plurality of index based question templates from the plurality of predefined question templates based on the annotated plurality of hierarchical index structures using an index based question template selection technique.

Figure 5A:
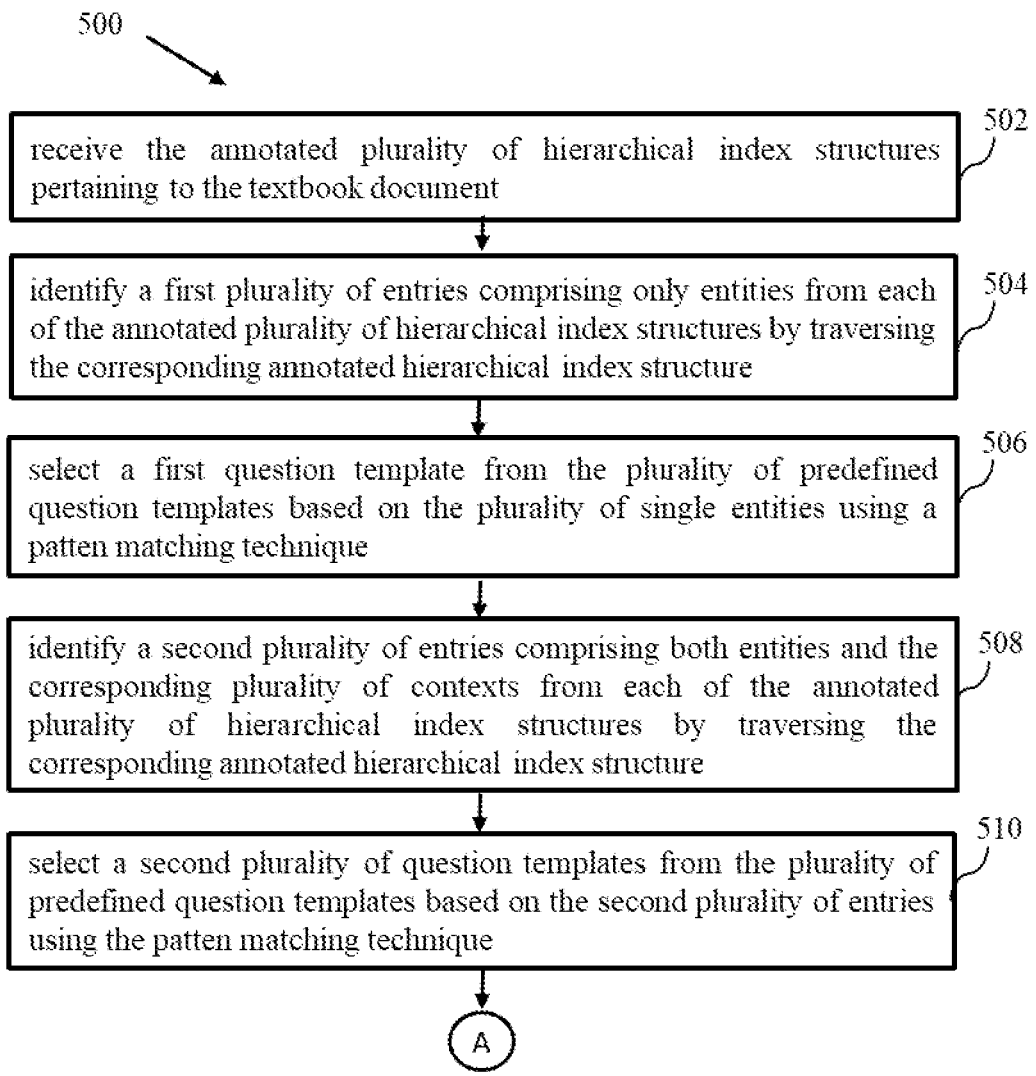
FIGS. 5A and 5B are exemplary flow diagrams illustrating a processor implemented method 500 for obtaining a plurality of index based question templates implemented by the system of FIG. 1 according to some embodiments of the present disclosure.
Figure 5B:
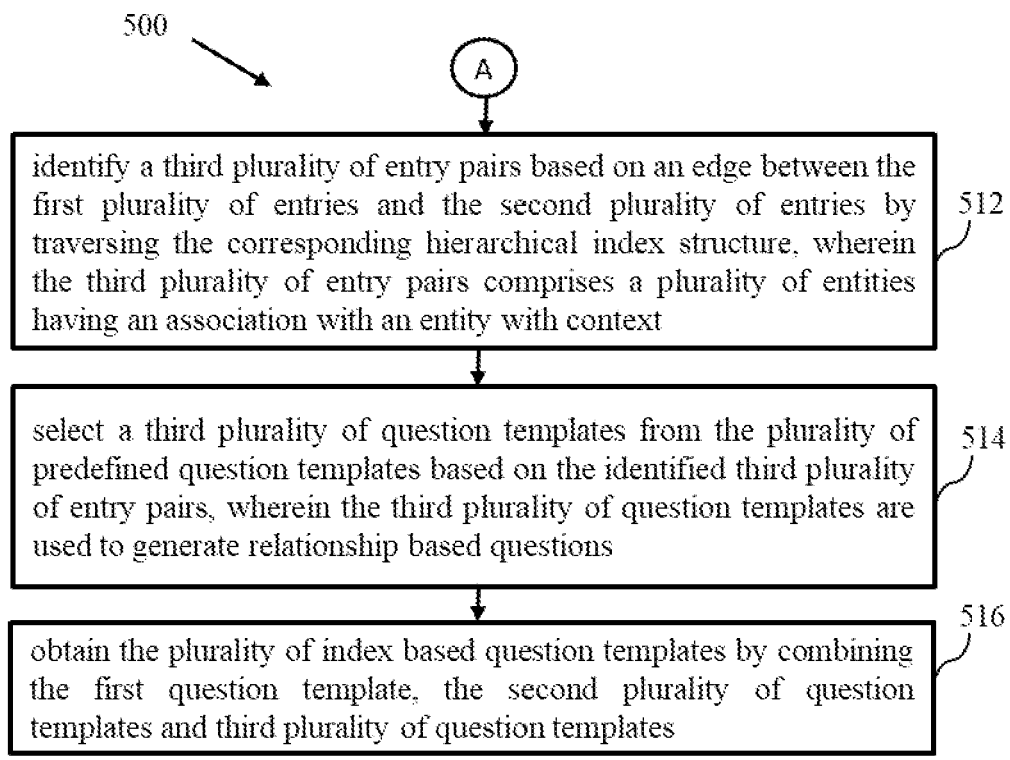

FIGS. 5A and 5B are exemplary flow diagrams illustrating a processor implemented method 500 for obtaining the plurality of index based question templates implemented by the system of FIG. 1 according to some embodiments of the present disclosure. Now referring to FIGS. 5A and 5B, at step 502 of the method 500, the one are more hardware processors 102 are configured by the programmed instructions to receive the annotated plurality of hierarchical index structures pertaining to the textbook document.

At step 504 of the method 500, the one or more hardware processors 102 are configured by the programmed instructions to identify a first plurality of entries comprising only entities from each of the annotated plurality of hierarchical index structures by traversing the corresponding annotated hierarchical index structure. Now referring to FIG. 4E, the first plurality of entries are "decorators", "call and instance management", "class decorators", "function decorators", and "decorator arguments" are entities.

At step 506 of the method 500, the one or more hardware processors 102 are configured by the programmed instructions to select a first question template from the plurality of predefined question templates based on the plurality of single entities using a pattern matching technique. For example, the selected first question template is "WHAT IS/ARE e?". Here, 'e' is entity.

At step 508 of the method 500, the one or more hardware processors 102 are configured by the programmed instructions to identify a second plurality of entries comprising both entities and the corresponding plurality of contexts from each of the annotated plurality of hierarchical index structures by traversing the corresponding annotated hierarchical index structure. Now referring to FIG. 4E, the node having entity with context is "versus function annotation". Here, "function annotation" is the entity and "versus" is the context. In an embodiment, the example contexts like "example", "use" and "property" are identified by matching the nodes of the corresponding hierarchical index structure with a corresponding regular expression "example(s)|instance(s) (of)*", "use(s)|usage|application(s)(of)*", "part(s)|component(s)|step(s) . . . (of|for) and the like.

At step 510 of the method 500, the one or more hardware processors 102 are configured by the programmed instructions to select a second plurality of question templates from the plurality of predefined question templates based on the second plurality of entries using the pattern matching technique. For example, the base question template is "WHAT IS/ARE c OF e?" and the plurality of second plurality of question templates are obtained by filling the "c" with the corresponding contextual terms like "example", "use" and "property". For example, the second plurality of question templates are "WHAT IS/ARE example OF e?", "WHAT IS/ARE use OF e?" and "WHAT IS/ARE property|(ies) OF e?" and the like. Here, ce' is filled with the corresponding entity during template instantiation.

At step 512 of the method 500, the one or more hardware processors 102 are configured by the programmed instructions to identify a third plurality of entry pairs based on an edge between the first plurality of entries and the second plurality of entries by traversing the corresponding hierarchical index structure. The third plurality of entry pairs includes a plurality of entities having an association with an entity with context. Now referring to FIG. 4E, 306 indicates a pair including an entity (decorator arguments) and the entity with context (versus function annotations).

Figure 4G:
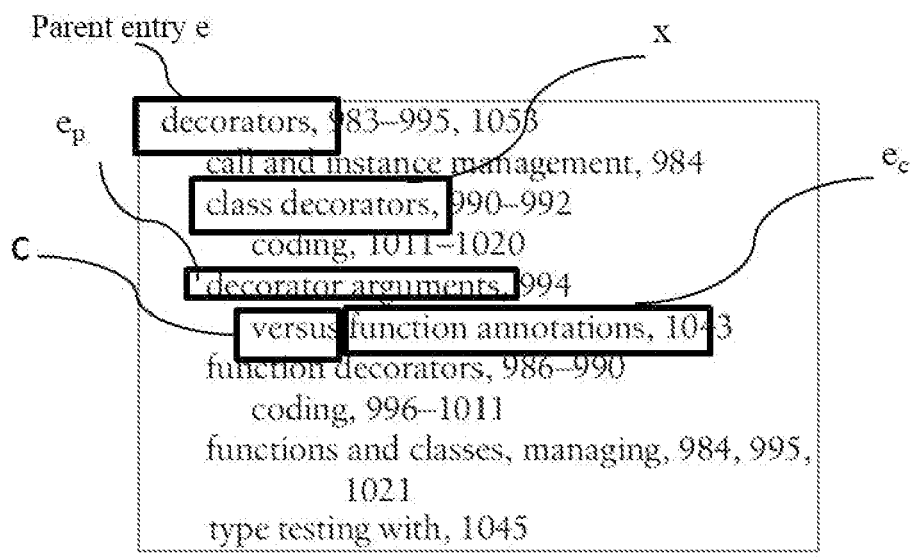

At step 514 of the method 500, the one or more hardware processors 102 are configured by the programmed instructions to select a third plurality of question templates from the plurality of predefined question templates based on the identified third plurality of entry pairs. The third plurality of question templates are used to generate relationship based questions by matching with a corresponding regular expression, for example, "(vs|versus|kompared to| . . . )". Here, the contexts for selecting relationship based question templates are "vs", "versus", "compared to" and the like. The third plurality of question templates selected by the step 514 are (i) "HOW DO YOU COMPARE $e_p$ AND $e_c$?" (ii) "WHAT IS THE RELATION BETWEEN $e_p$ AND $e_c$." (iii) "WHAT CAN YOU SAY ABOUT VBG followed by $e_p$, IN $e_p$, $e_{c1}$ FOR $e_p$, IN $e_{c1}$ FOR $e_p$, and eel IN $e_{c1}$ FOR $e_p$," (iv) "WHAT CAN YOU SAY ABOUT c $e_p$", (v) "WHAT IS/ARE c $e_p$?" and the like. Here '$e_p$' is the parent entity, '$e_c$' is entity with context as shown in FIG. 4G.

In an embodiment, the plurality of hierarchical question templates are context complete, wherein the context completeness is achieved by using a parent entry when it is unused in the template. For example, referring to FIG. 4G, the parent entry 'e' is unused. Hence it is used for selecting a context complete question template like "Regarding e, What is/are x", for example, "Regarding Decorators, what are class decorators?".

At step 516 of the method 500, the one or more hardware processors 102 are configured by the programmed instructions to obtaining the plurality of index based question templates by combining the first question template, the second plurality of question templates and third plurality of question templates.

Now referring back to method 300, at step 314 of the method 300, the TOC based question template selection module 216 executed by the one or more hardware processors 102 are configured by the programmed instructions to obtain a plurality of TOC based question templates from the plurality of predefined question templates based on the annotated plurality of TOC structures using a TOC structure based question template selection technique. The TOC structure based question template selection technique selects the plurality of TOC based question templates based on the plurality of type information. In an embodiment, the type information of the TOC entries are obtained using regular expressions involving POS tags and small dictionaries. For example, the plurality of TOC structured templates, based on the type information of the TOC entries, are defined/designed as "question (Q)", "CAN YOU EXPLAIN question phrase (QP)", "DO YOU THINK sentence (S)", "WHAT CAN YOU SAY ABOUT VBG phrase (VP)?", "WHAT IS/ARE simple noun phrase (SNP)?", "WHAT CAN YOU SAY ABOUT complex noun phrase (CNP)?" and the like.

In an embodiment, the TOC based question templates are context complete, wherein the context completeness is achieved by using a parent entry when it is unused similar to index based question templates. For example, if parent e is CNP or QP, "REGARDING e," is added to the template as prefix. For example, "Regarding the basics, what are function decorators?". Similarly, If parent 'e' is VP, "FOR e," prefix is selected, for example, "For managing calls and instances, what is the use of decorators?". Similarly, If parent e is S, "SINCE e," prefix is selected, for example, "Since decorators manage functions, what is the difference between decorators and higher order functions?". If parent ce' is Q "e" prefix is selected, for example, "What's a decorator? Can you explain why decorators?".

At step 316 of the method 300, the question generation module 218 executed by the one or more hardware processors 102 is configured by the programmed instructions to generate a plurality of long-form technical questions based on the annotated plurality of hierarchical index structure and the annotated plurality of TOC structures by instantiating the plurality of index based question templates and the plurality of TOC based question templates. For example, some of the plurality of index based question templates, the plurality of TOC based question templates and the corresponding plurality of long-form technical questions are shown in Table I and Table II.

TABLE I

| Sl. No | Index based question templates | Index based Questions |
|---|---|---|
| 1 | WHAT IS/ARE e | What is decorators? |
| 2 | WHAT IS/ARE example OF e?" | What is an example of decorators? |
| 3 | WHAT IS/ARE use OF e? | What are uses of decorators? |
| 4 | WHAT IS/ARE property|(ies) OF e? | What are the properties of function decorators? |

TABLE I-continued

| Sl. No | Index based question templates | Index based Questions |
|---|---|---|
| 5 | (HOW DO YOU COMPARE $e_p$ AND $e_c$? | How do you compare decorator arguments and function annotations? |
| 6 | WHAT IS THE RELATION BETWEEN $e_p$ AND $e_c$ | What are the relation between decorators and class decorators? |
| 7 | WHAT CAN YOU SAY ABOUT VBG followed by $e_p$, IN $e_p$, $e_{c1}$ FOR $e_p$, IN $e_{c1}$ FOR $e_p$, and $e_{c1}$ IN $e_{c2}$ FOR $e_p$ | What can you say about using decorators in functions? |
| 8 | WHAT CAN YOU SAY ABOUT c $e_p$, | What can you say about type testing with decorators? |
| 9 | WHAT IS/ARE c ep? | What is karma configurations for services? |

TABLE II

| Sl. No | TOC based question templates | TOC based questions |
|---|---|---|
| 1 | question (Q) | What's a Decorator? |
| 2 | CAN YOU EXPLAIN question phrase (QP) | Can you explain why decorators? |
| 3 | DO YOU THINK sentence (S)" | Do you think decorators manage functions and classes? |
| 4 | WHAT IS/ARE simple noun phrase (SNP)? | What are Class Decorators? |
| 5 | WHAT CAN YOU SAY ABOUT complex noun phrase (CNP)? | What can you say about things to remember about decorators? |
| 6 | "WHAT CAN YOU SAY ABOUT VBG phrase (VP)? | What can you say about managing calls and instances? |

In an embodiment, the generated plurality of long-form questions are evaluated by the system 100 using the plurality of metrics. The plurality of metrics includes a context-relevance, a context-closedness, a context-completeness, a level-span diversity and a number of unique technical question forms.

In an embodiment, the context-relevance identifies whether the plurality of questions comprises relevant non-trivial terms from the given context. Initially a plurality of non-trivial terms like 'decorators', 'coding' are identified from the generated plurality of long-form questions by tokenizing a question using tokenizer and removing stopwords, wh-words and prepositions using POS tagger. Further, each of the plurality of non-trivial terms are checked for presence in the entries in TOC or index by using stemming and a synonym dictionary. For example, the question "What are the benefits of decorators?" is context relevant since it contains a non-trivial term 'decorators' that is present in the index (FIG. 4C).

In an embodiment, the context-closedness indicates whether the non-trivial terms associated with the plurality of questions are from a single hierarchical path of the hierarchical index structure or TOC structure. This is achieved by: (i) creating a set of composite terms from all entries, where a composite term is the longest contiguous sequence of non-trivial terms in an entry, for example, in the question "what can you say about coding of class decorators?" composite terms are 'coding' and 'class decorators', (ii) Map these composite terms to some entry (or none) using Rouge- F1 score and (iii) check if all composite terms in the question are mapped, and to entries in a single hierarchy path. For example, the question "what can you say about coding of class decorators?" satisfies context-closedness since two composite terms 'coding' and 'class decorators' belongs to same hierarchical path and 'coding' is a child of 'class decorators'. However, the question "What is the relation between decorator arguments and class decorators?" is not satisfying context-closedness because composite terms 'decorator arguments' and 'class decorators' are not belongs to same hierarchical path, they are siblings.

In an embodiment, the context-completeness indicates whether the plurality of questions includes non-trivial terms from each ancestor entry in the hierarchy. Here, the system checks whether the composite terms in question cover parent entries up to the root entry. For example, the question "What is coding?" is not satisfying context-completeness because its ancestors 'class decorators' and 'decorators' in the hierarchical index are not present in the question. The question "Regrading decorators, what are class decorators?" is context-complete since its composite terms 'class decorators' and its parent 'decorators' present in the questions.

In an embodiment, the level-span diversity counts number of levels of the hierarchy spanned by the non-trivial terms of each of the plurality of questions. For example, the question "What are decorators?" is having level one and the question "How do you code class decorators?" is having two levels. In an embodiment, the questions set containing more level-spans is more diverse.

In another embodiment, the questions set containing more unique question forms is diverse. This is achieved by (i) mask all mapped terms in the question set and (ii) cluster the forms to ignore minor variations. For example, the question "What is the difference between decorator arguments and function annotations?" is converted into the form "What is the difference between < > and < >?" by masking 'decorator arguments' and 'function annotations'.

In an embodiment, a supervised question generation model like Bidirectional and Auto-Regressive Transformers (BART) or Text-to-Text Transfer Transformer (T5) is fine-tuned based on the generated plurality of long-form questions to generate optimal long-form technical questions from document structure like index structure and TOC.

Experimentation details: In an embodiment, the present disclosure is experimented as follows: A plurality of textbooks on diverse subjects like Python, PLSQL, Java, Machine Learning (ML) and Deep Learning (DL). The first two have the richest metadata structure, with 3-level indexes and TOCs. In contrast, Java textbook has a 2-level index, while ML and DL have 1-level indexes and DL has 2-level TOCs. The results of index based question generation and the TOC based question generation are shown in Table III and IV respectively. Now referring to Table III, EM1 through EM8 are Evaluation Metrics number of questions, percentage of context-relevance, percentage of context-closedness, percentage of context-completeness, a level-span diversity (1,2,3), a number of unique technical question forms and percentage of valid questions respectively.

TABLE III

| Subject | No. of Entries | EM1 | EM2 | EM3 | EM4 | EM5 | | | EM6 | EM8 |
| --- | --- | --- | --- | --- | --- | --- | --- | --- | --- | --- |
| | | | | | | 1 | 2 | 3 | | |
| Index based question generation | | | | | | | | | | |
| Python | 1822 | 1216 | 100 | 99 | 100 | 50 | 44 | 5 | 15 | 80 |
| Java | 2541 | 2294 | 100 | 100 | 100 | 73 | 27 | NA | 11 | 96 |
| DL | 585 | 556 | 100 | 100 | 100 | 100 | NA | NA | 2 | 98 |
| TOC based question generation | | | | | | | | | | |
| Python | 906 | 324 | 100 | 100 | 100 | 7 | 33 | 60 | 27 | 72 |
| Java | 866 | 503 | 100 | 100 | 100 | 4 | 45 | 50 | 21 | 72 |
| DL | 184 | 122 | 100 | 100 | 100 | 11 | 88 | NA | 11 | 84 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of document structure based unsupervised long-form technical question generation. The present disclosure provides a method for generating optimal long-form question questions from document structure like index and TOC since the index and TOC contains all concepts of the textbook. Further, the present disclosure evaluates the generated plurality of long-form technical questions using the plurality of evaluation metrics. Furthermore, the present disclosure can generate optimal technical questions by fine-tuning a question generation model.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors, a textbook document, wherein the textbook document is in Portable Document Format (PDF);

extracting, by the one or more hardware processors, a PDF metadata from the textbook document using a Natural Language Processing (NLP) technique, wherein the PDF metadata comprises text sizes, fonts, and text coordinates;

extracting, by the one or more hardware processors, a plurality of structures from the textbook document based on the PDF metadata using a NLP based filtering technique, wherein the plurality of structures comprising a plurality of hierarchical index structures and a plurality of Table of Content (TOC) structures, wherein each of the plurality of hierarchical index structures and the plurality of TOC structures is a tree structure comprising a plurality of nodes and a plurality of edges connecting the plurality of nodes;

annotating, by the one or more hardware processors, each of the plurality of hierarchical index structures by identifying a plurality of entities and a plurality of contexts corresponding to each of the plurality of entities using a parsing technique, wherein each of the plurality of nodes of each of the plurality of hierarchical index structures is annotated as one of a) an entity, b) a context, and c) an entity with context;

simultaneously annotating, by the one or more hardware processors, each of the plurality of TOC structures by identifying a plurality of type information using the parsing technique, wherein each of the plurality of nodes corresponding to each of the plurality of TOC structures are annotated as one of a) a question, b) a question phrase, c) a VBG (Verb Gerund present participle) phrase, d) a sentence and e) a noun phrase;

obtaining, by the one or more hardware processors, a plurality of index based question templates from a plurality of predefined question templates based on an annotated plurality of hierarchical index structures using an index based question template selection technique;

obtaining, by the one or more hardware processors, a plurality of TOC based question templates from the plurality of predefined question templates based on an annotated plurality of TOC structures using a TOC structure based question template selection technique, wherein the TOC structure based question template selection technique selects the plurality of TOC based question templates based on the plurality of type information; and generating, by the one or more hardware processors, a plurality of long-form technical questions based on the annotated plurality of hierarchical index structure and the annotated plurality of TOC structures by instantiating the plurality of index based question templates and the plurality of TOC based question templates.

2. The processor implemented method of claim 1, wherein each of the plurality of nodes associated with each of the plurality of the hierarchical index structures represents an entry in an index associated with the textbook document, and each of the plurality of nodes associated with each of the plurality of TOC structures represents an entry in TOC associated with the textbook document, wherein each of the plurality of edge represents relationship between the nodes.

3. The processor implemented method of claim 1, wherein the NLP based filtering technique removes header and footer from the textbook document and annotates entry, level, and page numbers in each of the plurality of hierarchical index structures and each of the plurality of TOC structures.

4. The processor implemented method of claim 1, further comprising fine-tuning a supervised question generation model based on the generated plurality of long-form questions to generate one or more optimal long-form technical questions from document structure, wherein the document structure comprises index and TOC.

5. The processor implemented method of claim 1, wherein the method of obtaining the plurality of index based question templates from the plurality of predefined question templates based on the annotated plurality of hierarchical index structures using the index based question template selection technique comprises:

receiving the annotated plurality of hierarchical index structures pertaining to the textbook document;

identifying a first plurality of entries comprising only entities from each of the annotated plurality of hierarchical index structures by traversing the corresponding annotated hierarchical index structure;

selecting a first question template from the plurality of predefined question templates based on the plurality of single entities using a pattern matching technique;

identifying a second plurality of entries comprising both entities and the corresponding plurality of contexts from each of the annotated plurality of hierarchical index structures by traversing the corresponding annotated hierarchical index structure;

selecting a second plurality of question templates from the plurality of predefined question templates based on the second plurality of entries using the pattern matching technique;

identifying a third plurality of entry pairs based on an edge between the first plurality of entries and the second plurality of entries by traversing the corresponding hierarchical index structure, wherein the third plurality of entry pairs comprises a plurality of entities having an association with an entity with context;

selecting a third plurality of question templates from the plurality of predefined question templates based on the identified third plurality of entry pairs, wherein the third plurality of question templates are used to generate relationship based questions; and obtaining the plurality of index based question templates by combining the first question template, the second plurality of question templates and third plurality of question templates.

6. The processor implemented method of claim 1, further comprises automatic evaluation of the plurality of long-form technical questions using a plurality of metrics comprising a context-relevance, a context-closedness, a context-completeness, a level-span diversity and a number of unique technical question forms, wherein the context-relevance is used to identify whether the plurality of questions comprises relevant non-trivial terms from the given context, wherein the context-closedness is used to identify whether the non-trivial terms associated with the plurality of questions are from a single hierarchical path of the hierarchical index structure or TOC structure, wherein the context-completeness is used to identify whether the plurality of questions includes non-trivial terms from each ancestor entry in the hierarchy, wherein the level-span diversity counts number of levels of the hierarchy spanned by the non-trivial terms of each of the plurality of questions.

7. A system comprising:
at least one memory storing programmed instructions; one or more Input/Output (I/O) interfaces; and one or more hardware processors operatively coupled to the at least one memory, wherein the one or more hardware processors are configured by the programmed instructions to:

receive a textbook document, wherein the textbook document is in Portable Document Format (PDF);

extract a PDF metadata from the textbook document using a Natural Language Processing (NLP) technique, wherein the PDF metadata comprises text sizes, fonts, and text coordinates;

extract a plurality of structures from the textbook document based on the PDF metadata using a NLP based filtering technique, wherein the plurality of structures comprising a plurality of hierarchical index structures and a plurality of Table of Content (TOC) structures, wherein each of the plurality of hierarchical index structures and the plurality of TOC structures is a tree structure comprising a plurality of nodes and a plurality of edges connecting the plurality of nodes;

annotate each of the plurality of hierarchical index structures by identifying a plurality of entities and a plurality of contexts corresponding to each of the plurality of entities using a parsing technique, wherein each of the plurality of nodes of each of the plurality of hierarchical index structures is annotated as one of a) an entity, b) a context, and c) an entity with context;

simultaneously annotate each of the plurality of TOC structures by identifying a plurality of type information using the parsing technique, wherein each of the plurality of nodes corresponding to each of the plurality of TOC structures are annotated as one of a) a question, b) a question phrase, c) a VBG (Verb Gerund present participle) phrase, d) a sentence and e) a noun phrase;

obtain a plurality of index based question templates from a plurality of predefined question templates based on an annotated plurality of hierarchical index structures using an index based question template selection technique;

obtain a plurality of TOC based question templates from the plurality of predefined question templates based on an annotated plurality of TOC structures using a TOC structure based question template selection technique, wherein the TOC structure based question template selection technique selects the plurality of TOC based question templates based on the plurality of type information; and generate a plurality of long-form technical questions based on the annotated plurality of hierarchical index structure and the annotated plurality of TOC structures by instantiating the plurality of index based question templates and the plurality of TOC based question templates.

8. The system of claim 7, wherein each of the plurality of nodes associated with each of the plurality of the hierarchical index structures represents an entry in an index associated with the textbook document, and each of the plurality of nodes associated with each of the plurality of TOC structures represents an entry in TOC associated with the textbook document, wherein each of the plurality of edge represents relationship between the nodes.

9. The system of claim 7, wherein the NLP based filtering technique removes header and footer from the textbook document and annotates entry, level, and page numbers in each of the plurality of hierarchical index structures and each of the plurality of TOC structures.

10. The system of claim 7, further comprising fine-tuning a supervised question generation model based on the generated plurality of long-form questions to generate one or more optimal long-form technical questions from document structure, wherein the document structure comprises index and TOC.

11. The system of claim 7, wherein the method of obtaining the plurality of index based question templates from the plurality of predefined question templates based on the annotated plurality of hierarchical index structures using the index based question template selection technique comprises:

receiving the annotated plurality of hierarchical index structures pertaining to the textbook document;

identifying a first plurality of entries comprising only entities from each of the annotated plurality of hierarchical index structures by traversing the corresponding annotated hierarchical index structure;

selecting a first question template from the plurality of predefined question templates based on the plurality of single entities using a pattern matching technique;

identifying a second plurality of entries comprising both entities and the corresponding plurality of contexts from each of the annotated plurality of hierarchical index structures by traversing the corresponding annotated hierarchical index structure;

selecting a second plurality of question templates from the plurality of predefined question templates based on the second plurality of entries using the pattern matching technique;

identifying a third plurality of entry pairs based on an edge between the first plurality of entries and the second plurality of entries by traversing the corresponding hierarchical index structure, wherein the third plurality of entry pairs comprises a plurality of entities having an association with an entity with context;

selecting a third plurality of question templates from the plurality of predefined question templates based on the identified third plurality of entry pairs, wherein the third plurality of question templates are used to generate relationship based questions; and obtaining the plurality of index based question templates by combining the first question template, the second plurality of question templates and third plurality of question templates.

12. The system of claim 7, further comprises automatic evaluation of the plurality of long-form technical questions using a plurality of metrics comprising a context-relevance, a context-closedness, a context-completeness, a level-span diversity and a number of unique technical question forms, wherein the context-relevance is used to identify whether the plurality of questions comprises relevant non-trivial terms from the given context, wherein the context-closedness is used to identify whether the non-trivial terms associated with the plurality of questions are from a single hierarchical path of the hierarchical index structure or TOC structure, wherein the context-completeness is used to identify whether the plurality of questions includes non-trivial terms from each ancestor entry in the hierarchy, wherein the level-span diversity counts number of levels of the hierarchy spanned by the non-trivial terms of each of the plurality of questions.

13. One or more non-transitory machine readable information storage mediums comprising one or more instructions which when executed by one or more hardware processors causes:

receiving a textbook document, wherein the textbook document is in Portable Document Format (PDF);

extracting a PDF metadata from the textbook document using a Natural Language Processing (NLP) technique, wherein the PDF metadata comprises text sizes, fonts, and text coordinates;

extracting a plurality of structures from the textbook document based on the PDF metadata using a NLP based filtering technique, wherein the plurality of structures comprising a plurality of hierarchical index structures and a plurality of Table of Content (TOC) structures, wherein each of the plurality of hierarchical index structures and the plurality of TOC structures is a tree structure comprising a plurality of nodes and a plurality of edges connecting the plurality of nodes;

annotating each of the plurality of hierarchical index structures by identifying a plurality of entities and a plurality of contexts corresponding to each of the plurality of entities using a parsing technique, wherein each of the plurality of nodes of each of the plurality of hierarchical index structures is annotated as one of a) an entity, b) a context, and c) an entity with context;

simultaneously annotating each of the plurality of TOC structures by identifying a plurality of type information using the parsing technique, wherein each of the plurality of nodes corresponding to each of the plurality of TOC structures are annotated as one of a) a question, b) a question phrase, c) a VBG (Verb Gerund present participle) phrase, d) a sentence and e) a noun phrase;

obtaining a plurality of index based question templates from a plurality of predefined question templates based on an annotated plurality of hierarchical index structures using an index based question template selection technique;

obtaining a plurality of TOC based question templates from the plurality of predefined question templates based on an annotated plurality of TOC structures using a TOC structure based question template selection technique, wherein the TOC structure based question template selection technique selects the plurality of TOC based question templates based on the plurality of type information; and generating a plurality of long-form technical questions based on the annotated plurality of hierarchical index structure and the annotated plurality of TOC structures by instantiating the plurality of index based question templates and the plurality of TOC based question templates.

14. The one or more non-transitory machine readable information storage mediums of claim 13, wherein each of the plurality of nodes associated with each of the plurality of the hierarchical index structures represents an entry in an index associated with the textbook document, and each of the plurality of nodes associated with each of the plurality of TOC structures represents an entry in TOC associated with the textbook document, wherein each of the plurality of edge represents relationship between the nodes.

15. The one or more non-transitory machine readable information storage mediums of claim 13, wherein the NLP based filtering technique removes header and footer from the textbook document and annotates entry, level, and page numbers in each of the plurality of hierarchical index structures and each of the plurality of TOC structures.

16. The one or more non-transitory machine readable information storage mediums of claim 13, further comprising fine-tuning a supervised question generation model based on the generated plurality of long-form questions to generate one or more optimal long-form technical questions from document structure, wherein the document structure comprises index and TOC.

17. The one or more non-transitory machine readable information storage mediums of claim 13, wherein the method of obtaining the plurality of index based question templates from the plurality of predefined question templates based on the annotated plurality of hierarchical index structures using the index based question template selection technique comprises:

receiving the annotated plurality of hierarchical index structures pertaining to the textbook document;

identifying a first plurality of entries comprising only entities from each of the annotated plurality of hierarchical index structures by traversing the corresponding annotated hierarchical index structure;

selecting a first question template from the plurality of predefined question templates based on the plurality of single entities using a pattern matching technique;

identifying a second plurality of entries comprising both entities and the corresponding plurality of contexts from each of the annotated plurality of hierarchical index structures by traversing the corresponding annotated hierarchical index structure;

selecting a second plurality of question templates from the plurality of predefined question templates based on the second plurality of entries using the pattern matching technique;

identifying a third plurality of entry pairs based on an edge between the first plurality of entries and the second plurality of entries by traversing the corresponding hierarchical index structure, wherein the third plurality of entry pairs comprises a plurality of entities having an association with an entity with context;

selecting a third plurality of question templates from the plurality of predefined question templates based on the identified third plurality of entry pairs, wherein the third plurality of question templates are used to generate relationship based questions; and obtaining the plurality of index based question templates by combining the first question template, the second plurality of question templates and third plurality of question templates.

18. The one or more non-transitory machine readable information storage mediums of claim 13, further comprises automatic evaluation of the plurality of long-form technical questions using a plurality of metrics comprising a context-relevance, a context-closedness, a context-completeness, a level-span diversity and a number of unique technical question forms, wherein the context-relevance is used to identify whether the plurality of questions comprises relevant non-trivial terms from the given context, wherein the context-closedness is used to identify whether the non-trivial terms associated with the plurality of questions are from a single hierarchical path of the hierarchical index structure or TOC structure, wherein the context-completeness is used to identify whether the plurality of questions includes non-trivial terms from each ancestor entry in the hierarchy, wherein the level-span diversity counts number of levels of the hierarchy spanned by the non-trivial terms of each of the plurality of questions.

* * * * *